(12) United States Patent
Nir

(10) Patent No.: US 6,430,329 B1
(45) Date of Patent: *Aug. 6, 2002

(54) INTEGRATED OPTICAL SWITCH ARRAY

(75) Inventor: David Nir, Tel Aviv (IL)

(73) Assignee: Lynx Photonix Networks Inc., Calabasas Hills, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/545,191

(22) Filed: Apr. 7, 2000

Related U.S. Application Data

(63) Continuation-in-part of application No. 09/270,675, filed on Mar. 16, 1999, now Pat. No. 6,263,125, which is a continuation-in-part of application No. 09/085,369, filed on May 19, 1998, now Pat. No. 6,236,775.

(51) Int. Cl.[7] .................................................. G02B 6/26
(52) U.S. Cl. .............................. 385/17; 385/16; 385/20
(58) Field of Search .............................. 385/16–20, 24, 385/14, 46, 50; 359/117, 123

(56) References Cited

U.S. PATENT DOCUMENTS

| 3,871,743 A | 3/1975 | Fulenwider |
| 3,941,927 A | 3/1976 | Russell |
| 4,120,560 A | 10/1978 | Baues et al. |
| 4,618,210 A | 10/1986 | Kondo |
| 4,787,693 A | 11/1988 | Kogelnik et al. |
| 4,822,124 A | 4/1989 | Suzuki |
| 5,050,951 A | 9/1991 | Caron et al. |
| 5,059,008 A | 10/1991 | Flood et al. |
| 5,182,554 A | 1/1993 | Kaiser et al. |
| 5,233,453 A | 8/1993 | Sivarajas et al. |
| 5,345,326 A | 9/1994 | Araki |
| 5,367,584 A | 11/1994 | Ghezzo et al. |
| 5,546,209 A | 8/1996 | Willner et al. |
| 5,604,617 A | 2/1997 | Burton |
| 5,729,642 A | 3/1998 | Thaniyavarn |
| 5,937,115 A | * 8/1999 | Domash ....................... 385/16 |
| 6,263,125 B1 | * 7/2001 | Nir ............................... 385/17 |

OTHER PUBLICATIONS

Schmidt, R.V., Integrated Optics Switches and Modulators, Hughes Research Laboratories, 3011 Malibu Canyon Rd., Malibu, CA 90265.

Schlaak, H.F., "Modulation Behavior of Integrated Optical Firectiona Couplers", J. Opt. Commun., 5 (1984) 4: 122–131.

* cited by examiner

Primary Examiner—Hemang Sanghavi
(74) Attorney, Agent, or Firm—Mark M. Friedman

(57) ABSTRACT

An optical switch array in which at least three input waveguides are coupled to at least three output waveguides. Each of the input waveguides is coupled in the same order to each of the output waveguides by a coupling element such as a y-junction combiner, via an intermediate waveguide and a switching mechanism that includes a coupling element such as a 1×2 switch. For compactness, the coupling elements that couple to the same input waveguide are mutually displaced along the output waveguides.

18 Claims, 11 Drawing Sheets

INTEGRATED OPTICAL SWITCH ARRAY

This is a continuation in part of U.S. patent application Ser. No. 09/270,675, filed Mar. 16, 1999, now U.S. Pat. No. 6,263,125 which is a continuation in part of U.S. patent application Ser. No. 09/085,369 filed May 19, 1998, now U.S. Pat. No. 6,236,775.

FIELD AND BACKGROUND OF THE INVENTION

The present invention relates to optical switch arrays and, more particularly, to an optical switch array, of particularly compact geometry, in which arbitrary combinations of the inputs and outputs are explicitly addressable.

Integrated optical switches are well-known. For an early review of the art, see Lars Thylen, "Integrated optics in LiNbO$_3$: recent developments in devices for telecommunications", *Journal of Lightwave Technology* vol. 6 no. 6 (June 1988), pp. 847–861. Waveguides are created in a lithium niobate substrate by processing the substrate locally to increase the index of refraction. For example, the index of refraction of lithium niobate may be increased locally by diffusing titanium into the substrate. To divert light from one waveguide to another, the waveguides are coupled by local optoelectrical manipulation of their indices of refraction. Well-known examples of optoelectrical switches include directional couplers, BOA couplers, digital-optical-switches and x-switches. Depending on the voltage applied to such a switch, light is thus partly or completely diverted from an input waveguide to an output waveguide.

By appropriately combining waveguides and switches, a switch array is formed to switch light from a plurality of input waveguides among a plurality of output waveguides. A variety of switch array geometries are known. FIG. 1A is a conceptual illustration of a switch of one such geometry: crossbar geometry. A set of input waveguides 10 crosses a set of output waveguides 12. At the crossing points, the waveguides are coupled by 2×2 switches 14. For simplicity, only four input 5 waveguides 10 and four output waveguides 12 are shown in FIG. 1A. Typically the numbers of input waveguides 10 and output waveguides 12 are equal powers of 2, up to a practical maximum of 32.

FIG. 1B shows, schematically, the actual layout of the switch array of FIG. 1A. Switches 14 are shown as directional couplers, in which parallel segments of the waveguides are flanked by electrodes (not shown) to which the coupling voltages are applied. Note that input waveguide 10*a* leads directly into output waveguide 12*a*, that input waveguide 10*b* leads directly into output waveguide 12*b*, that input waveguide 10*c* leads directly into output waveguide 12*c*, and that input waveguide 10*d* leads directly into output waveguide 12*d*. To allow arbitrary coupling of inputs to outputs, three auxiliary waveguides 11*a*, 11*b* and 11*c* are provided. Waveguides 10*a*–12*a* and 10*b*–12*b* are coupled in switch 14*a*. Waveguides 10*b*–12*b* and 10*c*–12*c* are coupled in switches 14*b* and 14*c*. Waveguides 10*c*–12*c* and 10*d*–12*d* are coupled in switches 14*d*, 14*e* and 14*f*. Waveguides 10*d*–12*d* and 11*a* are coupled in switches 14*g*, 14*h*, 14*i* and 14*j*. Waveguides 11*a* and 11*b* are coupled in switches 14*k*, 14*l* and 14*m*. Waveguides 11*b* and 11*c* are coupled in switches 14*n* and 14*o*. Note that switches 14*g*, 14*k* and 14*n* actually are 1×2 switches, that switches 14*j*, 14*m* and 14*o* actually are 2×1 switches, and that there is no switch corresponding to the lowermost 2×2 switch 14 of FIG. 1A. (A 1×2 switch is a 2×2 switch with one input deactivated; a 2×1 switch is a 2×2 switch with one output deactivated.)

Switch arrays based on geometries such as the crossbar geometry of FIGS. 1A and 1B can be used to divert input signals to output channels arbitrarily. Signals from any input channels can be directed to any output channel, and even to multiple output channels, in broadcast and multicast transmission modes.

Despite the conceptual simplicity of the crossbar geometry of FIGS. 1A and 1B, this geometry has been found inferior, in practice, to two other geometries, the tree geometry, illustrated in FIG. 2, and the double crossbar geometry, illustrated in FIG. 3. FIG. 2 shows the tree geometry, for four input waveguides 20 and four output waveguides 22. Waveguides 20 lead into a binary tree of 1×2 switches 24. Waveguides 22 emerge from a complementary binary tree of 2×1 switches 26. The highest order branches of the binary trees are connected by intermediate waveguides 28. FIG. 3 shows the double crossbar geometry, for four input waveguides 30 and four output waveguides 32. Each input waveguide 30 traverses four 1×2 switches 34*a*, 34*b*, 34*c* and 34*d*. Each output waveguide 32 traverses four 2×1 switches 36*a*, 36*b*, 36*c* and 36*d*. The remaining outputs of switches 34 are connected to respective inputs of switches 36 by intermediate waveguides 38. Note that, in principle, switches 34*d* and 36*a* are not needed, because input waveguides 30 could lead directly to switches 36*d* and output waveguides 32 could emerge directly from switches 36*a*; but, in practice, the illustrated configuration has been found to reduce cross-talk.

The tree and double crossbar geometries require larger numbers of switches than the equivalent crossbar geometry. Nevertheless, the tree and double crossbar geometries have certain advantages over the crossbar geometry:

1. The tree and double crossbar geometries have lower worst-case crosstalk than the crossbar geometry.

2. In general, the path from a particular input waveguide to a particular output waveguide through a crossbar switch array is not unique. Therefore, computational resources must be devoted to reconfiguring a crossbar switch array in real time. In a tree switch array or in a double crossbar switch array, the path from any particular input waveguide to any particular output waveguide is unique, so it is trivial to compute how to reconfigure such a switch array in real time.

3. To prevent loss of optical power by radiation, the intermediate waveguides of an optical switch array must have gentle curvature. In the case of the crossbar geometry, this requires that the switches be arranged in a diamond pattern, as illustrated in FIGS. 1A and 1B. This is a less efficient packing of the switches than, for example, the rectangular matrix pattern of the double crossbar switch as illustrated in FIG. 3.

SUMMARY OF THE INVENTION

According to the present invention there is provided an optical switch array including: (a) at least three output waveguides; (b) a first group of at least three input waveguides; (c) for each of the input waveguides of the first group: for each of the output waveguides, a combining element coupling the each output waveguide only to the each input waveguide; and (d) for each of the input waveguides of the first group, a switching mechanism for coupling all of the output waveguides to the each input waveguide; the output waveguides, the input waveguides, the combining elements and the switching mechanism all being arranged substantially in a common plane; all of the output waveguides traversing successively respective the combining elements in a common order relative to the input waveguides of the first group.

According to the present invention there is provided a method for switching signals to at least one of at least three output channels from at least one of at least three input channels, each input channel providing signals to only one output channel, including the steps of: (a) providing an optical switch array including: (i) at least three output waveguides, each of the output waveguides corresponding uniquely to one of the output channels, (ii) at least three input waveguides, each of the input waveguides corresponding uniquely to one of the input channels, (iii) for each of the input waveguides: for each of the output waveguides, a combining element coupling the each output waveguide only to the each input waveguide, and (iv) for each of the input waveguides, a switching mechanism for coupling all of the output waveguides to the each input waveguide, the output waveguides, the input waveguides, the combining elements and the switching mechanism all being arranged substantially in a common plane, all of the output waveguides traversing successively respective the combining elements in a common order relative to the input waveguides; and (b) for each of the input waveguides corresponding to an input channel wherefrom a signal is to be switched: setting the switching mechanism to divert at least a portion of the signal to the output waveguide corresponding to the output channel whereto the signal is to be switched.

According to the present invention there is provided a method for multicasting from at least one of at least three input channel to at least two of at least three output channels, each output channel receiving input from only one input channel, including the steps of: (a) providing an optical switch array including: (i) at least three input waveguides, each of the input waveguides corresponding uniquely to one of the input channels, (ii) at least three output waveguides, each of the output waveguides corresponding uniquely to one of the output channels, (iii) for each of the input waveguides: for each of the output waveguides, a combining element coupling the each output waveguide only to the each input waveguide, and (iv) for each of the input waveguides, a switching mechanism for coupling all of the output waveguides to each input waveguide, thereby coupling the input channel corresponding to each input waveguide to the output channels, the input waveguides, the output waveguides, the combining elements and the switching mechanisms all being arranged substantially in a common plane, all of the output waveguides traversing successively respective combining elements in a common order relative to the input waveguides; and (b) for each input channel wherefrom a signal is to be multicast: for each of the at least two output channels whereto the signal is to be sent, setting the switching mechanism, that couples the each input channel to the each output channel, to divert only a portion of the signal to the each output channel.

We have discovered that, by rearranging the connections of the double crossbar geometry of FIG. 3, a new geometry is obtained that allows a spatially more compact configuration of switches and interconnecting waveguides. Compactness is an important consideration, because it allows a larger switch array (more inputs and outputs) to be fabricated on a substrate of a given size. One substrate suffices for a switch array of the present invention that is functionally equivalent to a prior art switch array that may require two (double crossbar geometry) or three (tree geometry) substrates.

FIG. 4 shows the geometry of a switch array of the present invention, in the case of four input waveguides 40 and four output waveguides 42. As in the double crossbar geometry of FIG. 3, each input waveguide 40 traverses four 1×2 switches 44, each output waveguide 42 traverses four 2×1 switches 46, and the remaining outputs of switches 44 are connected to respective inputs of switches 46 by intermediate waveguides 48. Unlike the double crossbar geometry of FIG. 3, switches 46a all are traversed by the same output waveguide 42a, switches 46b all are traversed by the same output waveguide 42b, switches 46c all are traversed by the same output waveguide 42c, and switches 46d all are traversed by the same output waveguide 42d, so that all input waveguides 40 are coupled to output waveguides 42 in the same order: first to output waveguide 42a, then to output waveguide 42b, then to output waveguide 42c, and finally to output waveguide 42d. This allows intermediate waveguides 48 that lead to a particular output waveguide 42 to be geometrically adjacent, with a corresponding increase in the compactness of a switch array of the present invention as compared to an equivalent double crossbar switch array.

As in the double crossbar geometry of FIG. 3, strictly speaking, 1×2 switches 44d and the first 2×1 switches 46 traversed by output waveguides 42 are not necessary, and are present only to reduce cross-talk. Co-pending U.S. patent application Ser. No. 09/085,369 teaches a similar switch array geometry, in which these switches are in fact not present.

In the days before integrated optics, Fulenwider, in U.S. Pat. No. 3,871,743, described an optical switch array having a topology similar to that of the present invention. Unlike the present invention, the particular embodiment described by Fulenwider is not well-suited to fabrication as an integrated optical device. By contrast, a switch array of the present invention is easily fabricated, essentially in a single plane, as an integrated optical device, for example on a Z-cut lithium niobate substrate.

1×2 switches 44 and 2×1 switches 46 are indicated on FIG. 4 for illustrative purposes only. More generally, the scope of the present invention includes any suitable switching element in the role of 1×2 switch 44 and any suitable coupling element in the role of 2×1 switch 46. In particular, passive y-junction combiners may be substituted for 2×1 switches 46.

It will be appreciated that the switch array of FIG. 4 is reversible, in the sense that the roles of input and output can be exchanged. FIG. 4 still serves to illustrate such a reversed switch array, with reference numeral 40 designating output waveguides, reference numeral 42 designating input waveguides, reference numeral 44 designating 2×1 switches, and reference numeral 46 designating 1×2 switches. The scope of the present invention includes any suitable combining element in the role of 2×1 switch 44 and any suitable switching element in the role of 1×2 switch 46. In particular, passive y-junction combiners may be substituted for 2×1 switches 44.

To switch signals from an input channel, associated uniquely with a corresponding input waveguide, to one or more output channels, each output channel being associated uniquely with a corresponding output waveguide, the output waveguides are considered in turn. For each output waveguide, the switching element that couples the input waveguide associated with the desired input channel is set to divert the appropriate portion of the input signals of that channel to the target output waveguide. If signals from other input channels are to be switched to other output waveguides, then the corresponding other switching elements associated with the target output waveguide are set to pass those signals without diversion.

Switching signals using the reversed switch array is even simpler. To switch signals from an input channel, associated uniquely with a corresponding input waveguide, to one or more output channels, each output channel being associated uniquely with a corresponding output waveguide, the input waveguides are considered in turn. For each input waveguide, the switching elements that couple that input waveguide to the desired output waveguides are set to divert the appropriate portion of the input signal from that input waveguides channel to each of the desired output waveguides, and all the other switching elements of that input waveguide are set to a pass-through state.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of an integrated optical switch array whose geometry allows it to be fabricated more compactly than similar known optical switch arrays.

The principles and operation of an optical switch array according to the present invention may be better understood with reference to the drawings and the accompanying description.

Figure 5A:
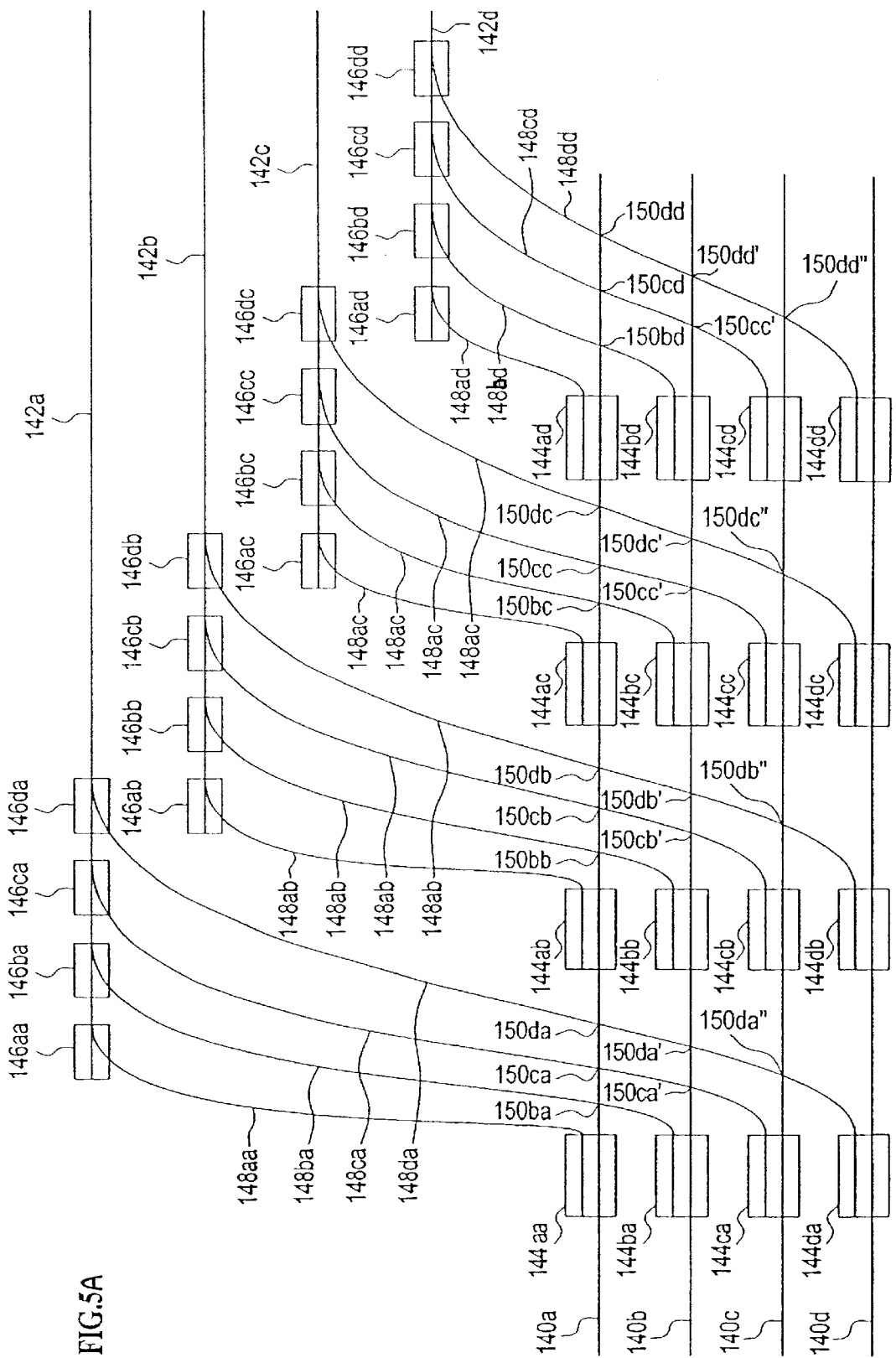
FIG. 5A is a schematic illustration of a first embodiment of a switch array of the present invention.

Referring now to the drawings, FIG. 5A is a schematic illustration of an optical switch array of the present invention, for coupling input waveguides 140*a*, 140*b*, 140*c* and 140*d* to output waveguides 142*a*, 142*b*, 142*c* and 142*d*. Input waveguide 140*a* is coupled to output waveguide 142*a* by a 1×2 switch 144*aa* via an intermediate waveguide 148*aa* and a passive y-junction combiner 146*aa*, to output waveguide 142*b* by a 1×2 switch 144*ab* via an intermediate waveguide 148*ab* and a passive y-junction combiner 146*ab*, to output waveguide 142*c* by a 1×2 switch 144*ac* via an intermediate waveguide 148*ac* and a passive y-junction combiner 146*ac*, and to output waveguide 142*d* by a 1×2 switch 144*ad* via an intermediate waveguide 148*ad* and a passive y-junction combiner 146*ad*. Input waveguide 140*b* is coupled to output waveguide 142*a* by a 1×2 switch 144*ba* via an intermediate waveguide 148*ba* and a passive y-junction combiner 146*ba*, to output waveguide 142*b* by a 1×2 switch 144*bb* via an intermediate waveguide 148*bb* and a passive y-junction combiner 146*bb*, to output waveguide 142*c* by a 1×2 switch 144*bc* via an intermediate waveguide 148*bc* and a passive y-junction combiner 146*bc*, and to output waveguide 142*d* by a 1×2 switch 144*bd* via an intermediate waveguide 148*bd* and a passive y-junction combiner 146*bd*. Input waveguide 140*c* is coupled to output waveguide 142*a* by a 1×2 switch 144*ca* via an intermediate waveguide 148*ca* and a passive y-junction combiner 146*ca*, to output waveguide 142*b* by a 1×2 switch 144*cb* via an intermediate waveguide 148*cb* and a passive y-junction combiner 146*cb*, to output waveguide 142*c* by a 1×2 switch 144*cc* via an intermediate waveguide 148*cc* and a passive y-junction combiner 146*cc*, and to output waveguide 142*d* by a 1×2 switch 144*cd* via an intermediate waveguide 148*cd* and a passive y-junction combiner 146*cd*. Input waveguide 140*d* is coupled to output waveguide 142*a* by a 1×2 switch 144*da* via an intermediate waveguide 148*da* and a passive y-junction combiner 146*da*, to output waveguide 142*b* by a 1×2 switch 144*db* via an intermediate waveguide 148*db* and a passive y-junction combiner 146*db*, to output waveguide 142*c* by a 1×2 switch 144*dc* via an intermediate waveguide 148*dc* and a passive y-junction combiner 146*dc*, and to output waveguide 142*d* by a 1×2 switch 144*dd* via an intermediate waveguide 148*dd* and a passive y-junction combiner 146*dd*.

Waveguides 140 and 142, as well as 1×2 switches 144 and y-junction combiners 146, are fabricated by standard techniques, for example on the surface of a Z-cut lithium niobate crystal, essentially in a single plane. As a result, some of the intermediate waveguides intersect all but one of the input waveguides. Specifically, intermediate waveguide 148*ba* intersects input waveguide 140*a* at intersection 150*ba*; intermediate waveguide 148*ca* intersects input waveguide 140*a* at intersection 150*ca* and input waveguide 140*b* at intersection 150*ca'*; intermediate waveguide 148*da* intersects input waveguide 140*a* at intersection 150*da*, input waveguide 140*b* at intersection 150*da'* and input waveguide 140*c* at intersection 150*da''*; intermediate waveguide 148*bb* intersects input waveguide 140*a* at intersection 150*bb*; intermediate waveguide 148*cb* intersects input waveguide 140*a* at intersection 150*cb* and input waveguide 140*b* at intersection 150*cb'*; intermediate waveguide 148*db* intersects input waveguide 140*a* at intersection 150*db*, input waveguide 140*b* at intersection 150*db'* and input waveguide 140*c* at intersection 150*db''*; intermediate waveguide 148*bc* intersects input waveguide 140*a* at intersection 150*bc*; intermediate waveguide 148*cc* intersects input waveguide 140*a* at intersection 150*cc* and input waveguide 140*b* at intersection 150*cc'*; and intermediate waveguide 148*dc* intersects input waveguide 140*a* at intersection 150*dc*, input waveguide 140*b* at intersection 150*dc'* and input waveguide 140*c* at intersection 150*dc''*.

Figure 1A:
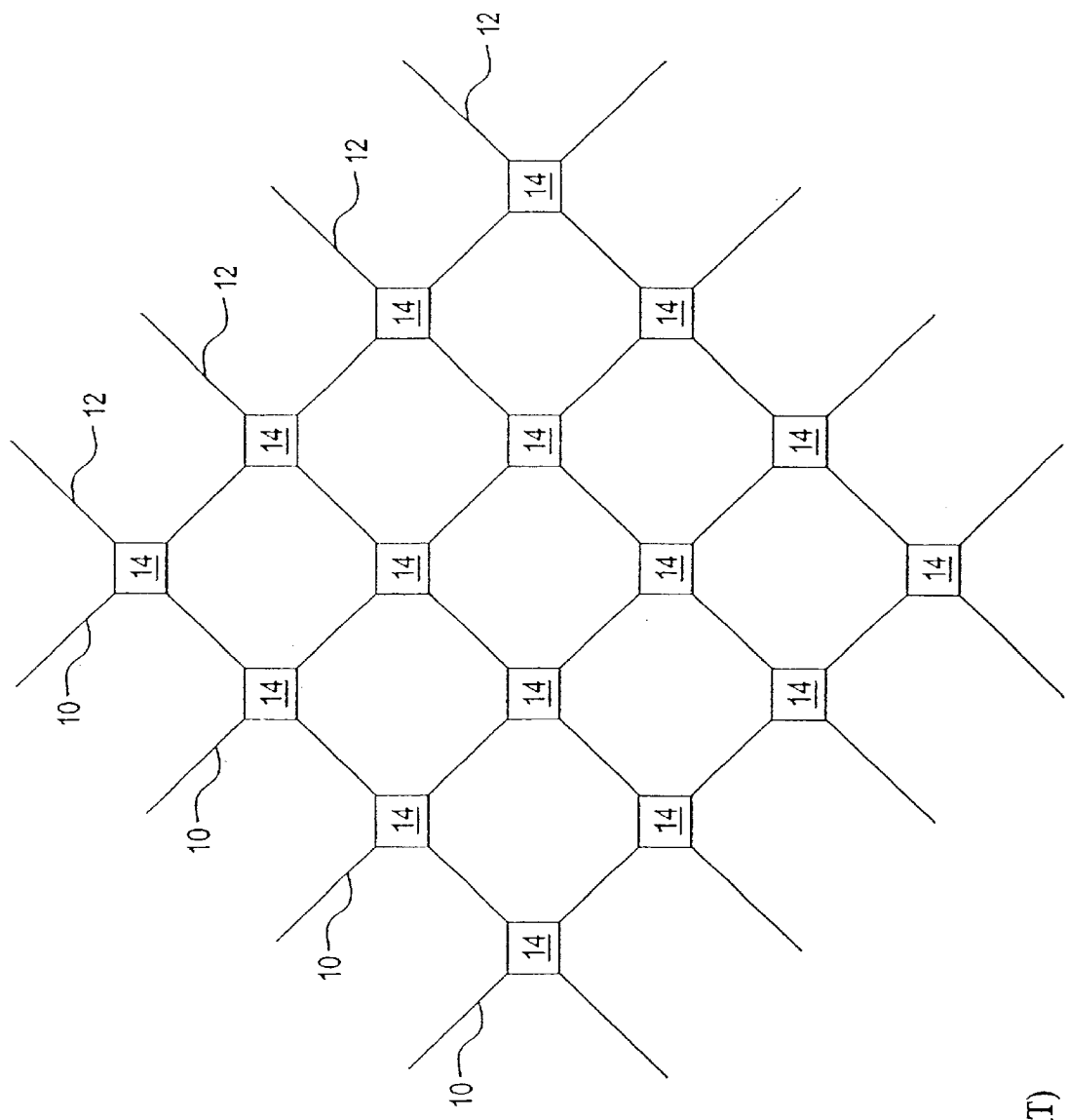
FIG. 1A (prior art) shows the geometry of a crossbar switch array.
Figure 1B:
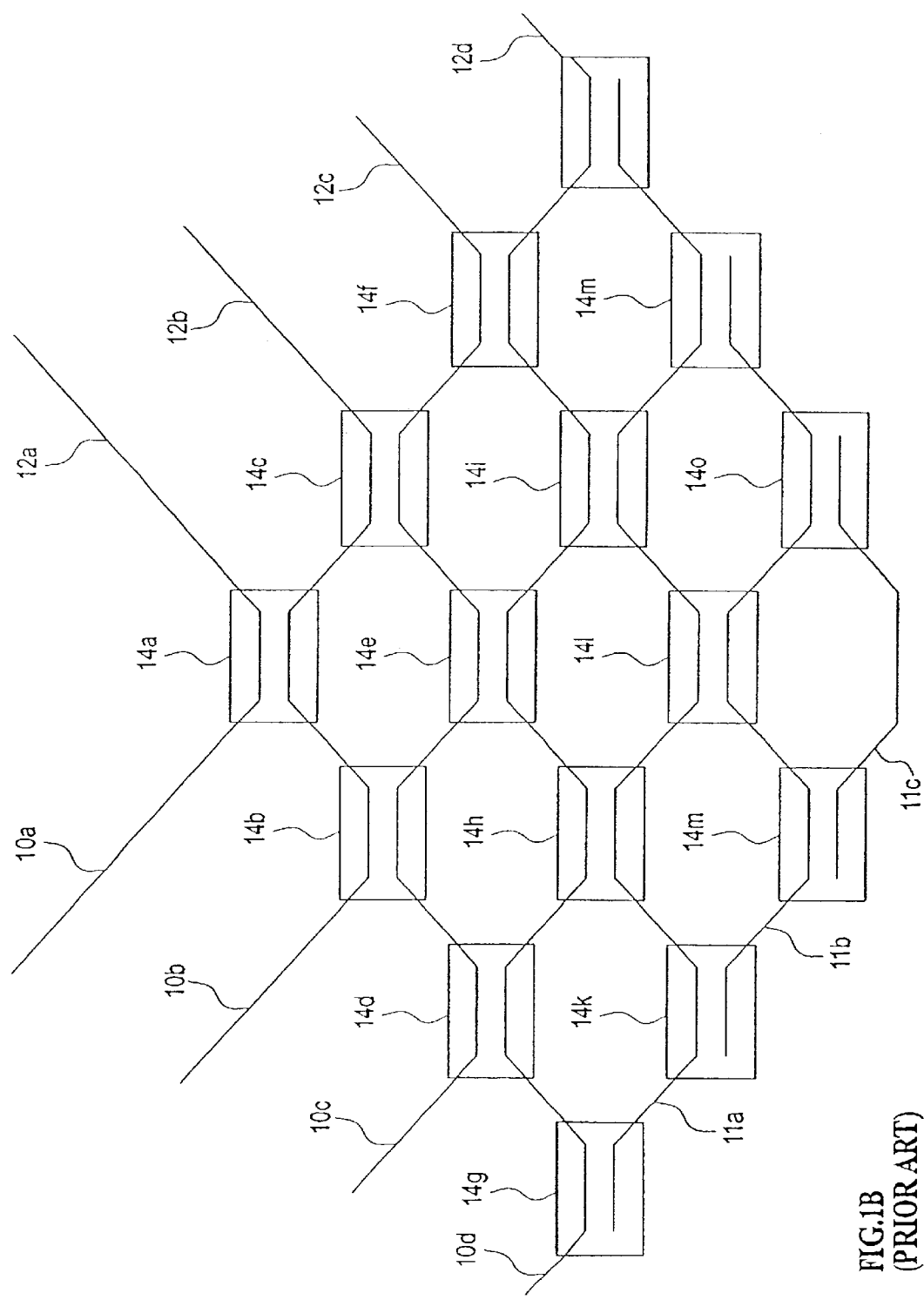
FIG. 1B (prior art) is a schematic depiction of the layout of the crossbar switch array of FIG. 1A.
Figure 2:
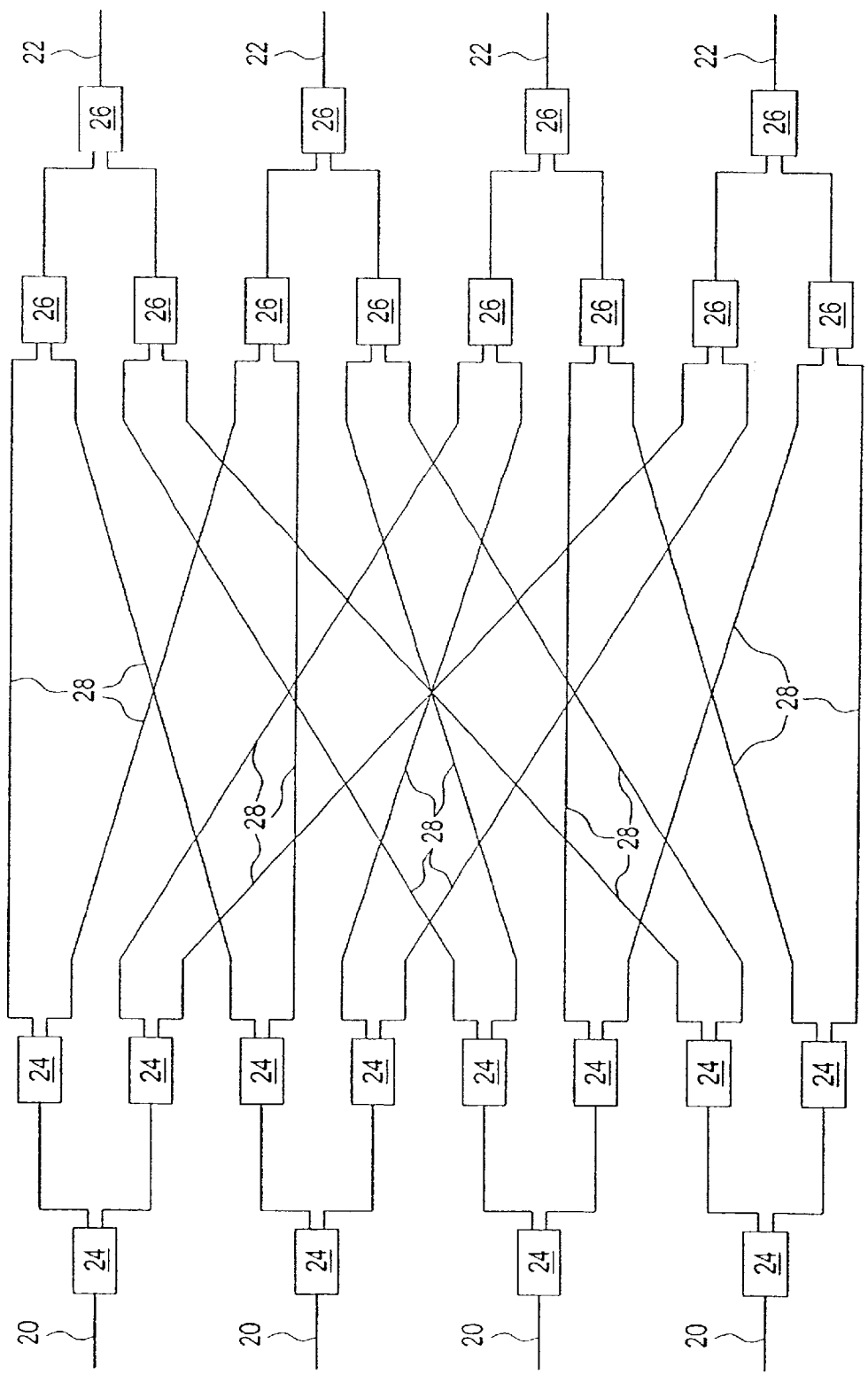
FIG. 2 (prior art) shows the geometry of a tree switch array.
Figure 3:
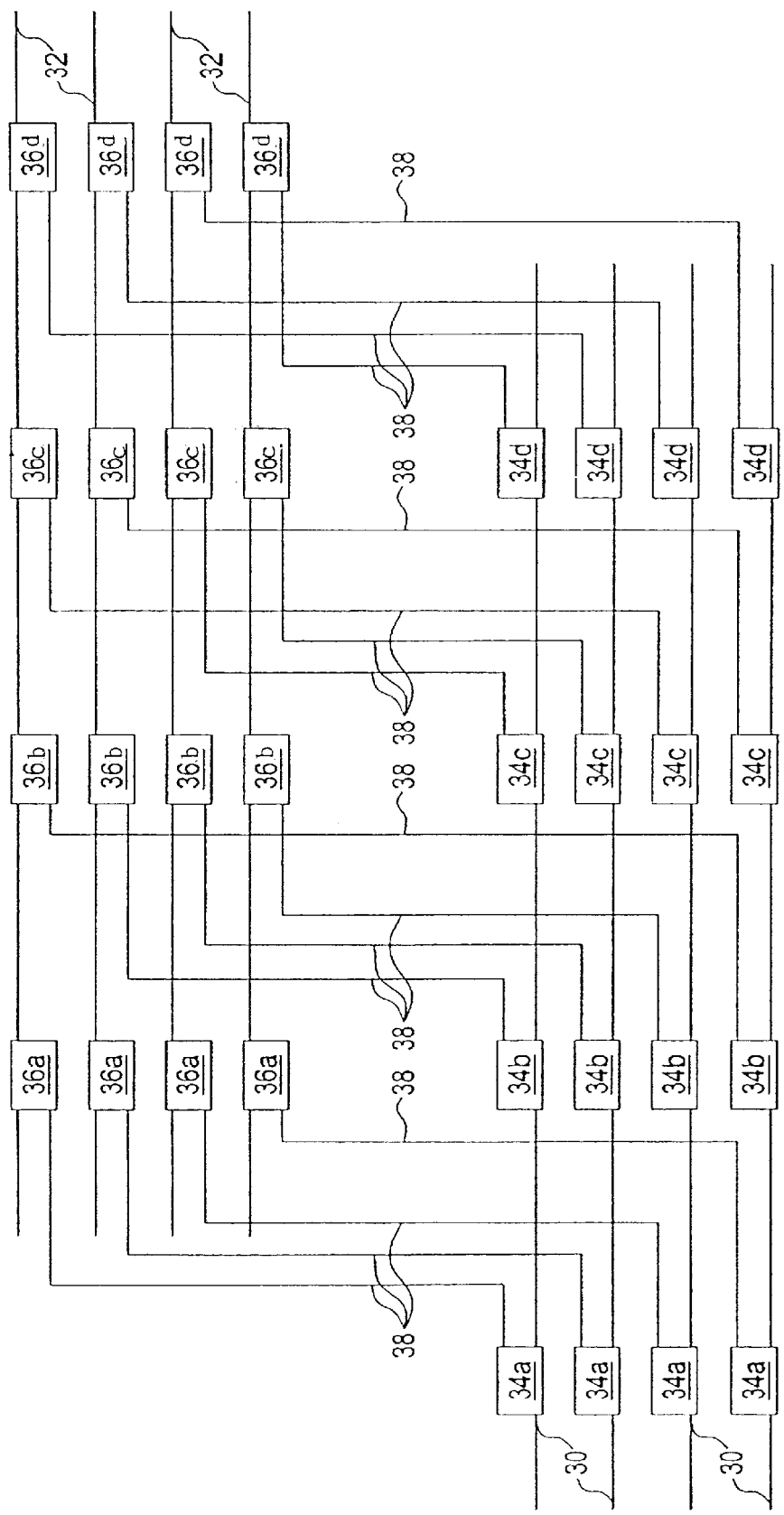
FIG. 3 (prior art) shows the geometry of a double crossbar switch array.

1×2 switches 144 are illustrative of switching elements for coupling input waveguides 140 to output waveguides 142. The scope of the present invention includes all such switching elements. The particular 1×2 switches 144 illustrated in FIG. 2 are directional couplers. For simplicity, the electrodes of directional couplers 144 are not shown. As in the case of the prior art switch arrays, any suitable 1×2 switches, including BOA couplers, digital-optical-switches and x-switches, may be used as 1×2 switches 144.

Figure 4:
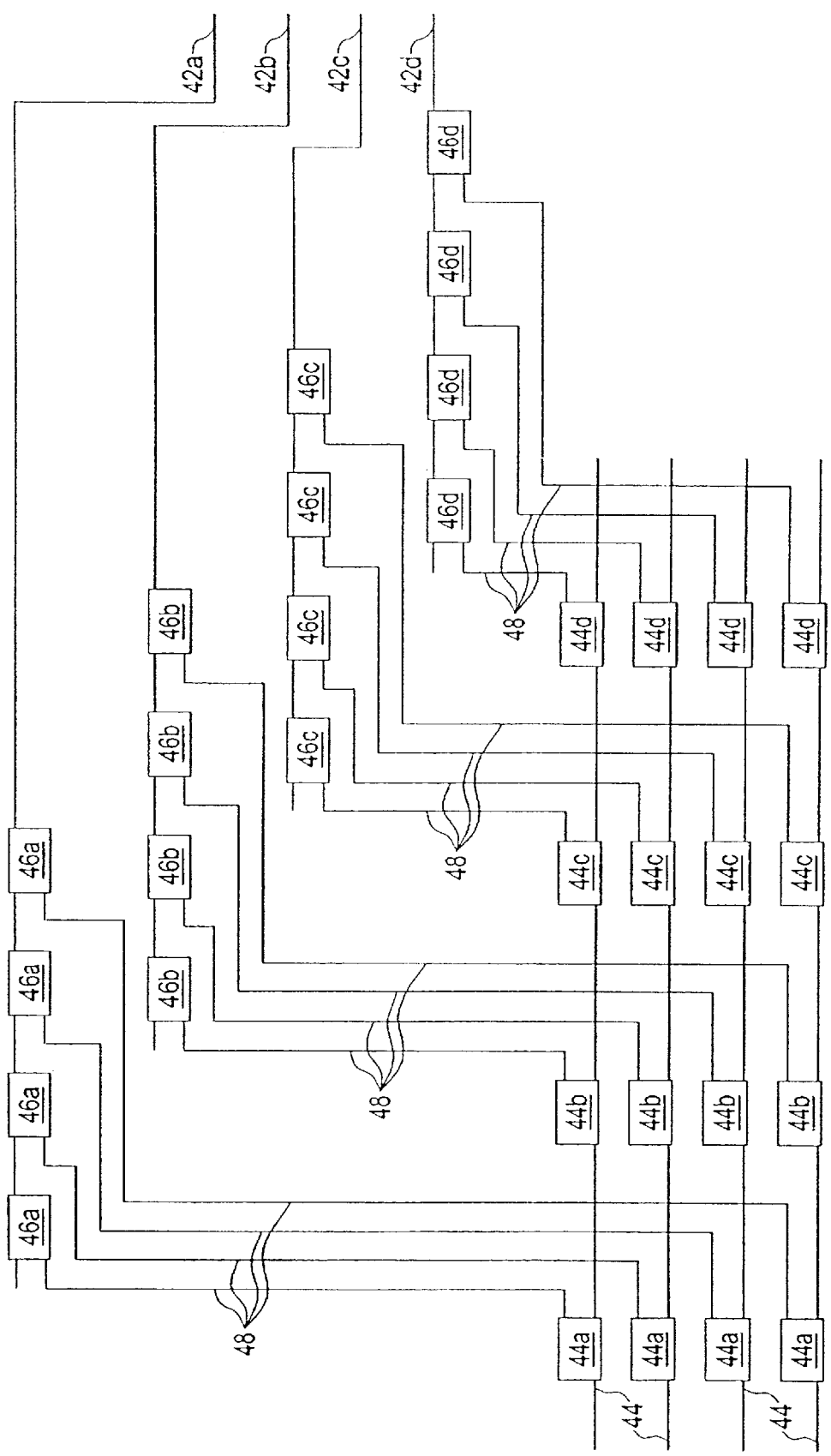
FIG. 4 shows the geometry of a switch array of the present invention.

Passive y-junction combiners 146 are illustrative of coupling elements for coupling input waveguides 140 to output waveguides 142. The difference between a "switching element" and a "coupling element", as these terms are used herein, is that a coupling element may be either passive or active, whereas a switching element is necessarily active. In FIG. 4, coupling elements 46 that couple input waveguides 40 to output waveguides 42 are active coupling elements, specifically 2×1 switches. As in the case of 1×2 switches 44 and 144, these 2×1 switches may be any suitable 2×1 switches, including directional couplers, BOA couplers, digital-optical-switches and x-switches.

The advantage of passive couplers 146 over active couplers 46 is that in an optical switch using passive couplers 146, fewer active elements need to be addressed than in an optical switch using active couplers 46. The advantages of active couplers 46 over passive couplers 146 are that a passive coupler 146 requires an elaborate design geometry to prevent loss of part of the incoming radiation to a second order mode; and that an active coupler 46 in its off state reduces crosstalk by actively blocking incoming signals from the associated intermediate waveguide 48.

In the general case of N input waveguides 40 or 140 and M output waveguides 42 or 142, an optical switch array of the present invention includes NM switching elements 44 or 144, NM coupling elements 46 or 146, and N(N−1)M/2 intersections 28.

To switch optical signals from input waveguides 40 or 140 to output waveguides 42 or 142 efficiently, with minimal losses, implementations of the optical switches of FIGS. 4 and 5A must obey certain geometric constraints. These constraints depend on the wavelength of the light used. For the commonly used wavelength of 1550 nm, the following constraints apply: Except where coupled in switching elements 44 or 144 or coupling elements 46 or 146, waveguides 40, 42, 140 and 142 should be at least about 0.5 mm apart. 1×2 switches 44 and 144 and 2×1 switches 46 typically are between 5 mm and 7 mm long. Parallel columns of 1×2 switches, for example the column including switches 44a and the column including switches 44b, should be at least about 1 mm apart. The intersection angle at intersections 150 should be such that input waveguides 140 and intermediate waveguides 148 are not coupled at intersections 150. The radii of curvature of the curved portions of intermediate waveguides 48 and 148, and the radii of curvature of the curved portions, if any, of input and output waveguides 40, 42, 140 and 142, should be at least 25 mm, and more preferably at least 30 mm. Within these geometric constraints, it is possible to fit as many as 32 input waveguides 40 or 140 and as many as 32 output waveguides 42 or 142 on the face of a Z-cut 4" diameter lithium niobate crystal.

Depending on the voltages applied to their electrodes, 1×2 switches 44 or 144 and 2×1 switches 46 may be placed in a straight-through state, in which the two channels of the switch are uncoupled, a crossover state, in which the two channels exchange signals, and any state in-between, for partial exchange of signals. In general, it is straightforward to select switch configurations to achieve any desired switching pattern of signals from input waveguides 40 or 140 to output waveguides 42 or 142. Switch configurations are selected by successive consideration of the desired output waveguides 42 or 142, taking advantage of the fact that each output channel receives input from only one input channel. For each output waveguide 42 or 142, switch 44 or 144 that couples the desired input waveguide 40 or 140 to the target output waveguide 42 or 142 is set to the state that diverts the desired portion of the input signal to the target output waveguide 142, and, if necessary, some or all of the rest of switches 44 or 144 that couple to the target output waveguide 42 or 142 are set to the straight-through state. This applies both to ordinary switching, in which signals from each input channel is switched to only one output channel, and to multicasting, in which signals from one of the input channels are split among two or more output channels. An important special case of multicasting is broadcasting, in which signals from only one input channel are distributed among all the output channels.

For example, using the embodiment of FIG. 5A, and associating channel a with waveguides 140a and 142a, channel b with waveguides 140b and 142b, and channel c with waveguides 140c and 142c, suppose that it is desired to direct input signals from channel a to output on channel b, input signals from channel b to output on channel c, and input signals from channel c to output on channel a. In the leftmost column of switches 144, that couples to output waveguide 142a, switch 144ca is set to the crossover state, while switches 144aa and 144ba are set to the straight-through state. In the next column of switches 144, that couples to output waveguide 142b, switch 144ab is set to the crossover state, while switch 144bb is set to the straight-through state. The state of switch 144cb is arbitrary, because the entire incoming signal on channel c was diverted to channel a by switch 144ca. Finally, in the next column of switches 144, that couples to output waveguide 142c, switch 144bc is set to the crossover state. The states of the remaining switches 144 is arbitrary.

Similarly, to broadcast equally from channel a to all three output channels, switch 144aa is set to divert ⅓ of the incoming signal, switch 144ab is set to divert ½ of the incoming signal, and switch 144ac is set to the full crossover state. The states of the remaining switches 144 is arbitrary.

In this context, it should be noted that the switches used by Fulenwider, which consist of input gratings and acoustic beam steerers, can assume only the straight-through state and the crossover state. Partial diversion of a signal from one channel to another, as is necessary for multicasting, requires the use of more modem switches, such as the integrated optic switches used in the present invention.

Figure 5B:
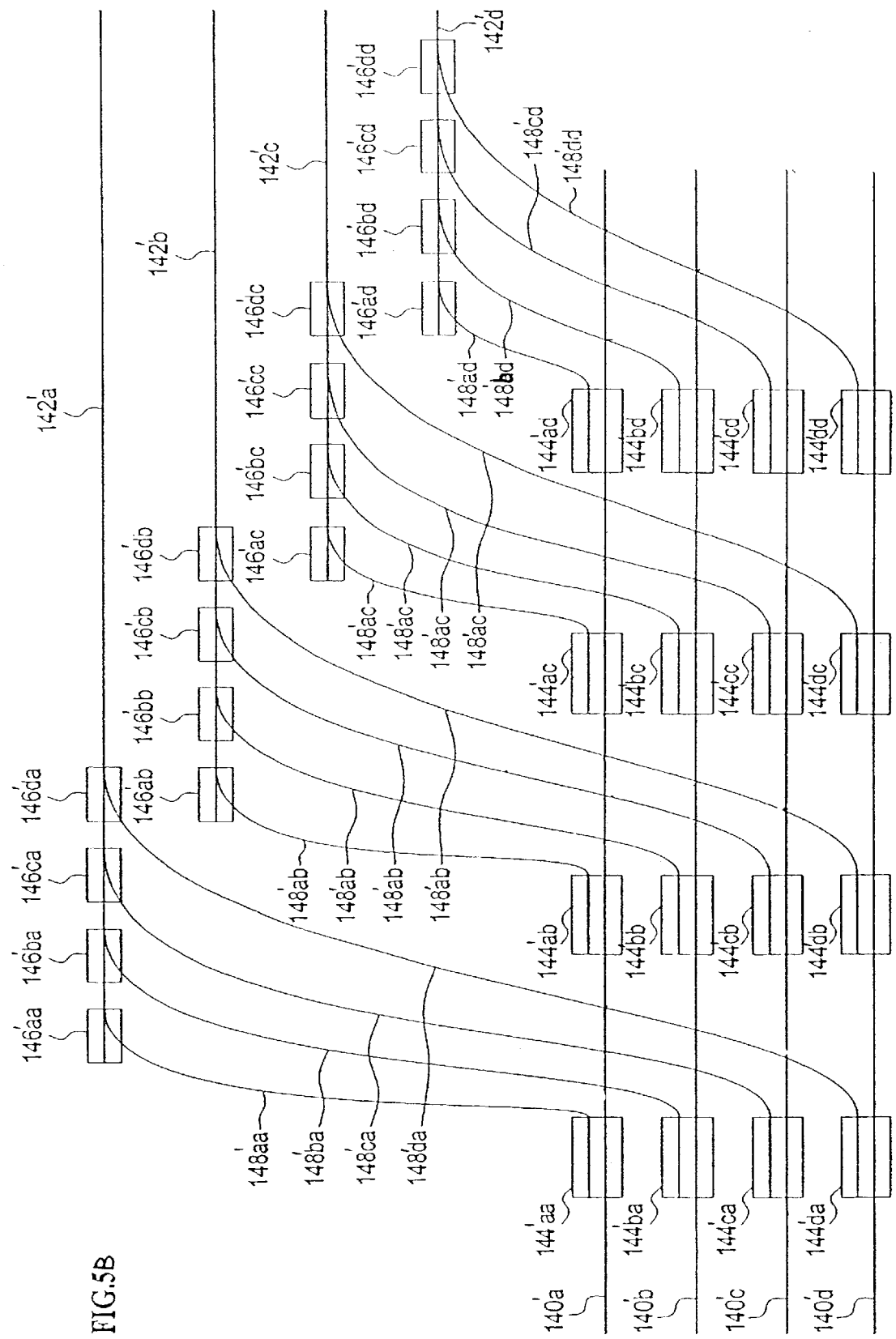
FIG. 5B is a schematic illustration of a first embodiment of a reversed switch array of the present invention.

As noted above, the switch arrays of the present invention are reversible. FIG. 5B serves to illustrate a reversed switch of the present invention. The switch array of FIG. 5B is identical in topology to the switch array of FIG. 5A, with reference numerals 140'a, 140'b, 140'c and 140'd designating output waveguides, reference numerals 142'a, 142'b, 142'c and 142'd designating input waveguides, reference numerals 144'aa through 144'dd designating passive y-junction combiners, reference numerals 146'aa through 146'dd designating 1×2 switches and reference numerals 148'aa through 148'dd designating intermediate waveguides. To direct input signals from channel a to output on channel b, input signals from channel b to output on channel c, and input signals from channel c to output on channel d, switches 146'ba, 146'cb and 146'ac are set to the crossover state, switches 146'ca, 146'da, 146'db, 146'bc, 146'cc and 146'dc are set to the straight-through state, and the states of all other switches 146' are arbitrary. To broadcast equally from channel a to all three output channels, switch 146'da is set to the straight-through state, switch 146'ca is set to divert ⅓ of the incoming signal, switch 146'ba is set to divert ½ of the incoming signal, switch 146'aa is set to the full crossover state and the states of all other switches 146' are arbitrary.

Figure 6A:
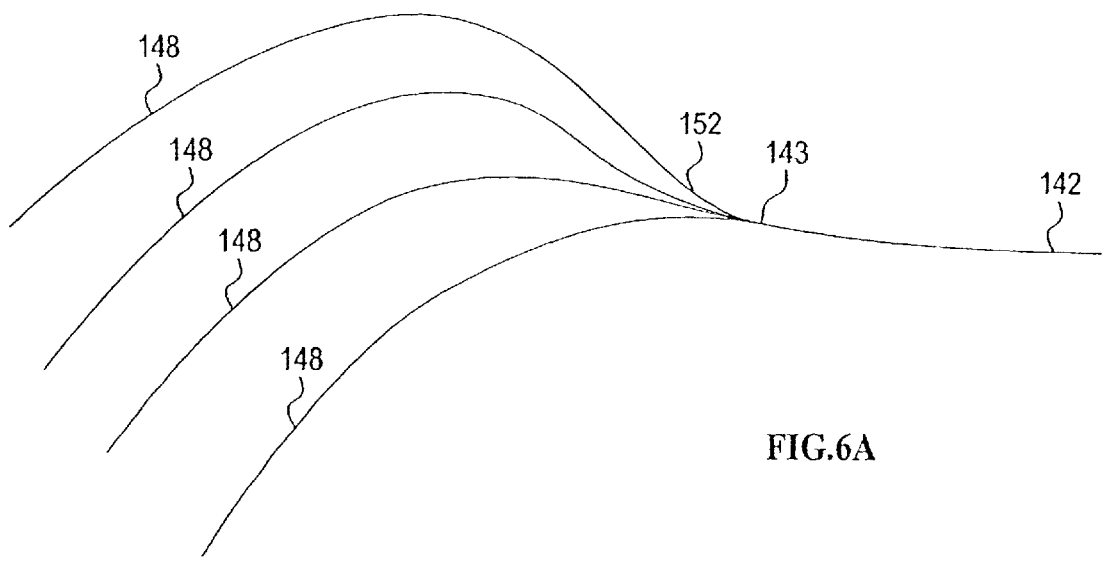
FIGS. 6A and 6B show alternate combining mechanisms.
Figure 6B:
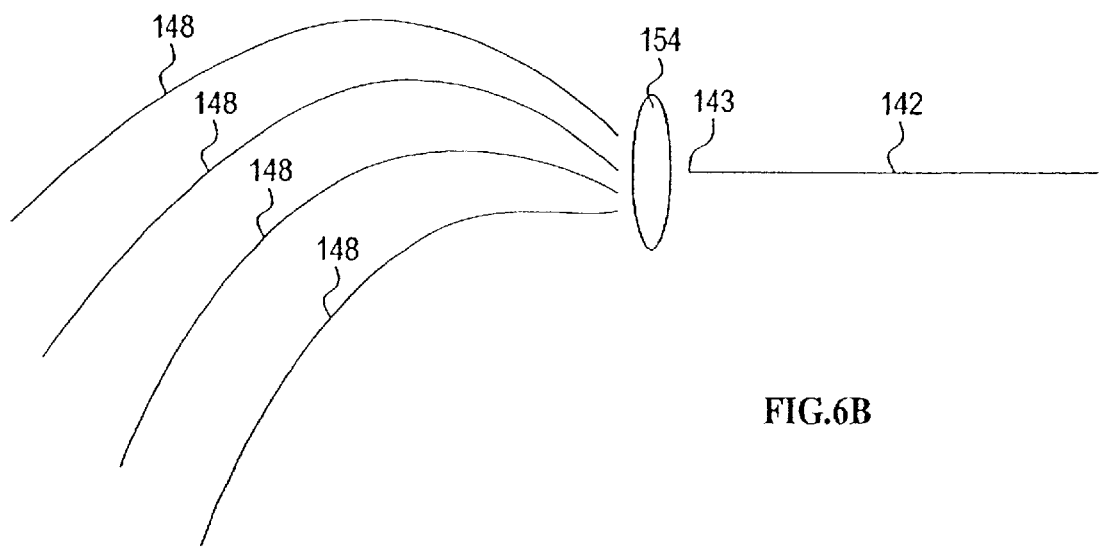

Active couplers 46a collectively constitute a combining mechanism for coupling input waveguides 40 into output waveguide 42a. Likewise, passive couplers 146aa, 146ba, 146ca and 146da collectively constitute a combining mechanism for coupling input waveguides 140 into output waveguide 142a. Similarly, active couplers 46b collectively constitute a combining mechanism for coupling input waveguides 40 into output waveguide 42b; active couplers 46c collectively constitute a combining mechanism for coupling input waveguides 40 into output waveguide 42c; and active couplers 46d collectively constitute a combining mechanism for coupling input waveguides 40 into output waveguide 42d. Likewise, passive couplers 146ab, 146bb, 146cb and 146db collectively constitute a combining mechanism for coupling input waveguides 140 into output waveguide 142b; passive couplers 146ac, 146bc, 146ce and 146de collectively constitute a combining mechanism for coupling input waveguides 140 into output waveguide 142c; and passive couplers 146ad, 146bd, 146cd and 146dd collectively constitute a combining mechanism for coupling input waveguides 140 into output waveguide 142d. FIGS. 6A and 6B show alternative combining mechanisms.

FIG. 6A shows four intermediate waveguides 148 merging into a passive funnel structure 152 at an input end 143 of an output waveguide 142. Funnel structures 152 must be designed geometrically to minimize losses due to generation of high order modes at the funnel necks.

FIG. 6B shows four intermediate waveguides 148 coupled into input end 143 of output waveguide 144 by a planar lens 154. Planar lens 154 may be fabricated in a lithium niobate substrate by proton exchange, to locally increase the index of refraction of the lithium niobate. Planar lens 154 is shown as a refractive lens. Alternatively, planar lens 154 may be a Fresnel lens.

Similarly, 1×2 switches 146'aa, 146'ba, 146'ca and 146'da collectively constitute a switching mechanism for coupling input waveguide 142'a to output waveguides 140; 1×2 switches 146'ab, 146'bb, 146'cb and 146'db collectively constitute a switching mechanism for coupling input waveguide 142'b to output waveguides 140; 1×2 switches 146'ac, 146'bc, 146'cc and 146'dc collectively constitute a switching mechanism for coupling input waveguide 142'c to output waveguides 140; and 1×2 switches 146'ad, 146'bd, 146'cd and 146'dd collectively constitute a switching mechanism for coupling input waveguide 142'd to output waveguides 140.

FIG. 5A illustrates another feature of the present invention that increases the compactness of an optical switch of the present invention, particularly when many more than the only four input waveguides 140 shown in FIG. 5A are coupled to many more than the only four output waveguides 142 shown in FIG. 5A. Specifically, switching elements 144 that couple input waveguides 140 into a particular output waveguide 142 are displaced relative to each other along input waveguides 140. As drawn in FIG. 5A, switching element 144aa is displaced rightward of switching element 144ab, switching element 144ab is displaced rightward of switching element 144ac, and switching element 144ac is displaced rightward of switching element 144ad. Switching elements 144ab, 144bb, 144cb and 144db that couple input waveguides 140 into output waveguide 142b, switching elements 144ac, 144bc, 144cc and 144dc that couple input waveguides 140 into output waveguide 142c, and switching elements 144ad, 144bd, 144cd and 144dd that couple input waveguides 140 into output waveguide 142d are mutually displaced along their respective input waveguides 140 in a similar manner. In the case of a large number of input waveguides 140 and output waveguides 142, this mutual displacement allows an intermediate waveguide 150, that couples a last (bottommost in FIG. 5A) input waveguide 140 to one of output waveguides 142 (for example, output waveguide 140a), to avoid intersecting intermediate waveguides 150 that couple first (topmost in FIG. 5A) input waveguides (for example, input waveguides 140a and 140b) to the next output waveguide (for example, output waveguide 142b). It will be appreciated that limiting the number of waveguide intersections, to the N(N−1)M/2 minimum number of intersections required by the geometry of the present invention, minimizes the cross-talk between input and output channels. Of course, the mutual displacement shown for switching elements 144ad, 144bd, 144cd and 144dd is not strictly necessary, because there is not "next output waveguide" following last output waveguide 142d.

Inspection of FIG. 5A also shows that the mutual displacement of switching elements 144 that couple into the same output waveguide 142 also allows intermediate waveguides 148 that lead to that waveguide 142 to be positioned closer to each other than would otherwise be possible. The upper bound on the mutual displacement of those switching elements 144 is set by the constraint that, just as parallel waveguides 140 or 142 must be separated by a minimum distance in order to prevent crosstalk, so parallel waveguides 148, that lead to the same output waveguide 142, must be separated by a minimum distance in order to prevent crosstalk.

Figure 7:
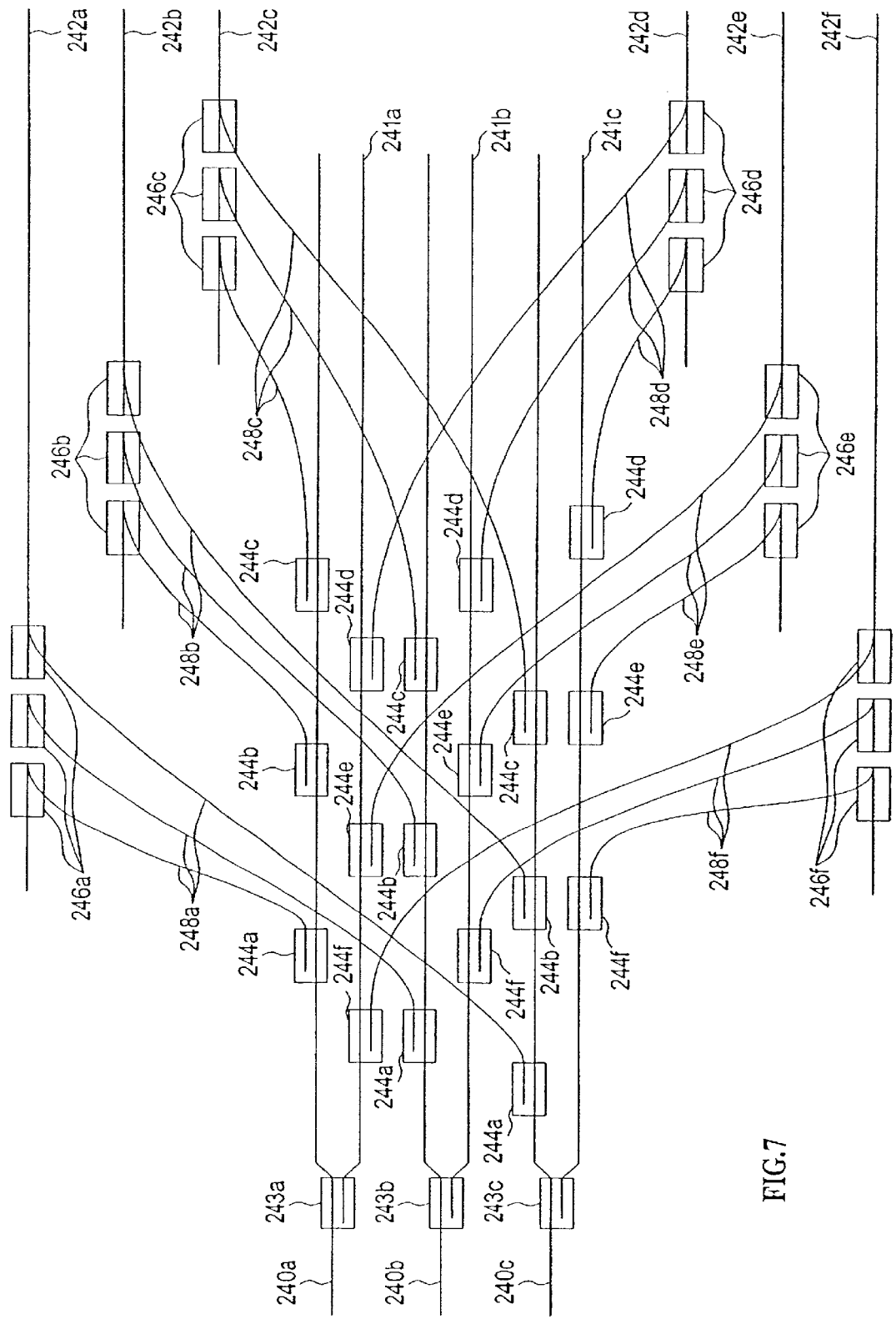
FIG. 7 is a schematic illustration of a second embodiment of a switch array of the present invention.

FIG. 7 is a schematic illustration of a second embodiment of the optical switch array of the present invention, for coupling three input waveguides 240 to six output waveguides 242. Each input waveguide 240 is coupled to a corresponding, parallel auxiliary waveguide 241 by a splitting switch 243. Input waveguides 240 are coupled to output waveguide 242a by switching elements 244a via intermediate waveguides 248a and coupling elements 246a; to output waveguide 242b by switching elements 244b via intermediate waveguides 248b and coupling elements 246b; and to output waveguide 242c by switching elements 244c via intermediate waveguides 248c and coupling elements 246c. Auxiliary waveguides 241 are coupled to output waveguide 242d by switching elements 244d via intermediate waveguides 248d and coupling elements 246d; to output waveguide 242e by switching elements 244e via intermediate waveguides 248e and coupling elements 246e; and to output waveguide 242f by switching elements 244f via intermediate waveguides 248f and coupling elements 246f. As in the embodiment of FIG. 5A, switching elements 244a are mutually displaced along input waveguides 240, as are switching elements 244b and switching elements 244c. Similarly, switching elements 244d are mutually displaced along auxiliary waveguides 241, as are switching elements 244e and switching elements 244f. The configuration of FIG. 7 allows increased compactness because the two groups of intermediate waveguides 248 and output waveguides 242 branch away from input waveguides 240 on opposite sides of input waveguides 240. Because some intermediate waveguides 248d, 248e and 248f intersect some intermediate waveguides 248a, 248b and 248c, there are more intersections in the embodiment of FIG. 7 than in an equivalent embodiment configured according to FIG. 5A; but this does not add appreciably to the cross-coupling because the angles of mutual intersection of intermediate waveguides 248 is about twice the angles of intersection of intermediate waveguides 248 with input waveguides 240 and auxiliary waveguides 241.

Figure 8:
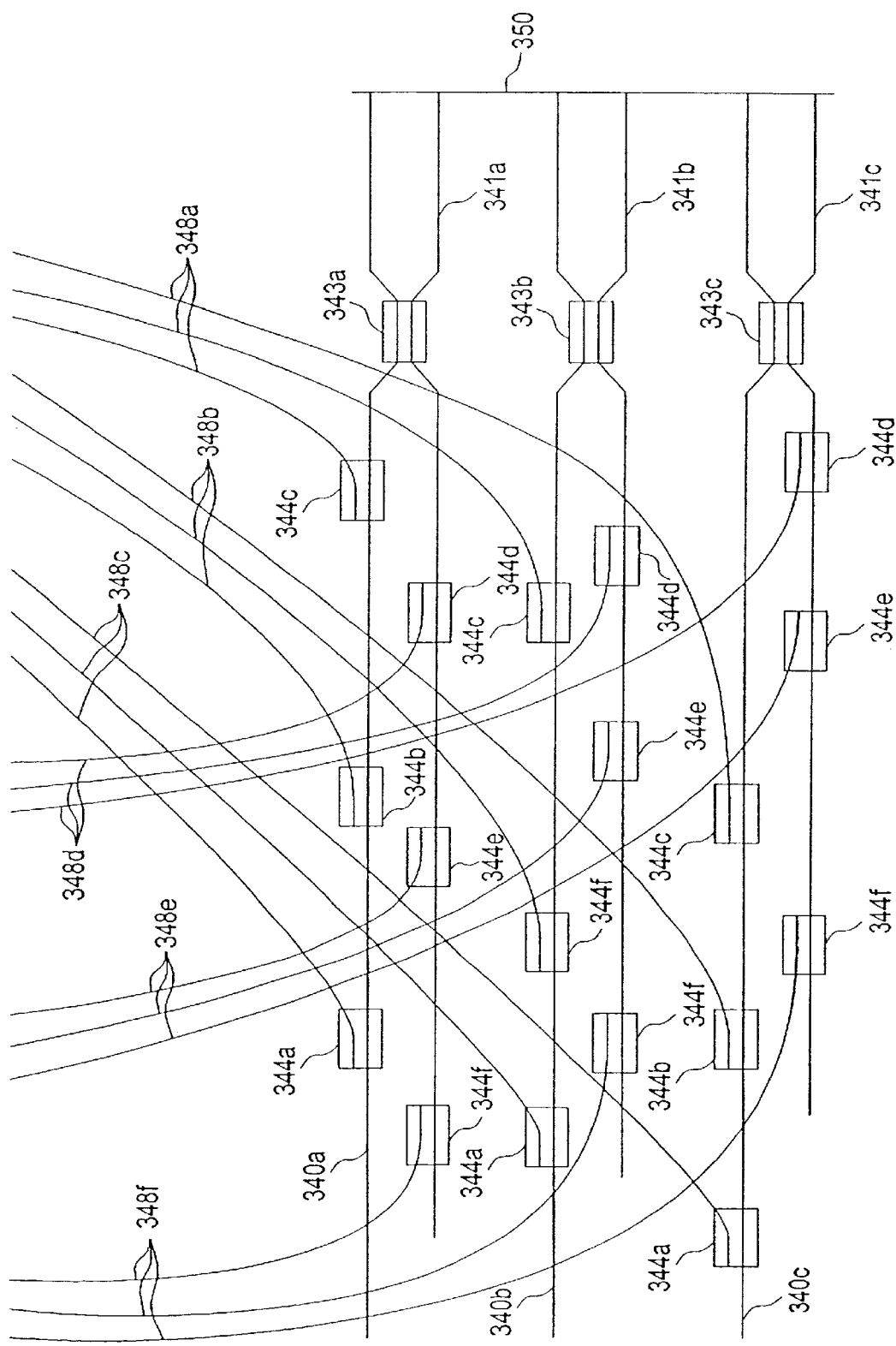
FIG. 8 is a schematic illustration of a third embodiment of a switch array of the present invention.

FIG. 8 is a partial schematic illustration of a third embodiment of the optical switch array of the present invention, for coupling three input waveguides 340 to six output waveguides (not shown). Each input waveguide 340 is coupled to a corresponding, parallel auxiliary waveguide 341 by a 50% coupler 343 and a 100% reflector 350. In effect, each auxiliary waveguide 341 is an extension of the corresponding input waveguide 340 in the opposite direction, because half the light entering an input waveguide 340 and reaching the corresponding 50% coupler 343 is coupled into the corresponding auxiliary waveguide 341, and the remaining half of the light is coupled into the corresponding auxiliary waveguide 341 by the corresponding 50% coupler 343 after reflecting off of reflector 350. Input waveguides 340 are coupled to a first output waveguide by switching elements 344a via intermediate waveguides 348a, to a second output waveguide by switching elements 344b via intermediate waveguides 348b, and to a third output waveguide by switching elements 344c via intermediate waveguides 348c. Auxiliary waveguides 341 are coupled to a fourth output waveguide by switching elements 344d via intermediate waveguides 348d, to a fifth output waveguide by switching elements 344e via intermediate waveguides 348e, and to a sixth output waveguide by switching elements 344f via intermediate waveguides 348f. As in the embodiments of FIGS. 5A and 7, switching elements 344a are mutually displaced along input waveguides 340, as are switching elements 344b and switching elements 344c. As in the embodiment of FIG. 7, switching elements 344d are mutually displaced along auxiliary waveguides 341, as are switching elements 344e and switching elements 344f. For illustrational simplicity, the output waveguides and the coupling elements that couple intermediate waveguides 348 thereto are not shown. The configuration of FIG. 8 allows increased compactness because the two groups of intermediate waveguides 348 and corresponding output waveguides branch away from input waveguides 340 in opposite directions.

If the embodiment of FIG. 8 is fabricated on the surface of a z-cut lithium niobate crystal, then reflector 350 is formed by depositing a metal coating on a flattened and polished surface perpendicular to waveguides 340 and 341, or by depositing a series of dielectric layers, appropriate to the wavelength of the light being switched, on that flattened and polished surface, or by mechanically attaching a mirror to that flattened and polished surface.

Figure 9:
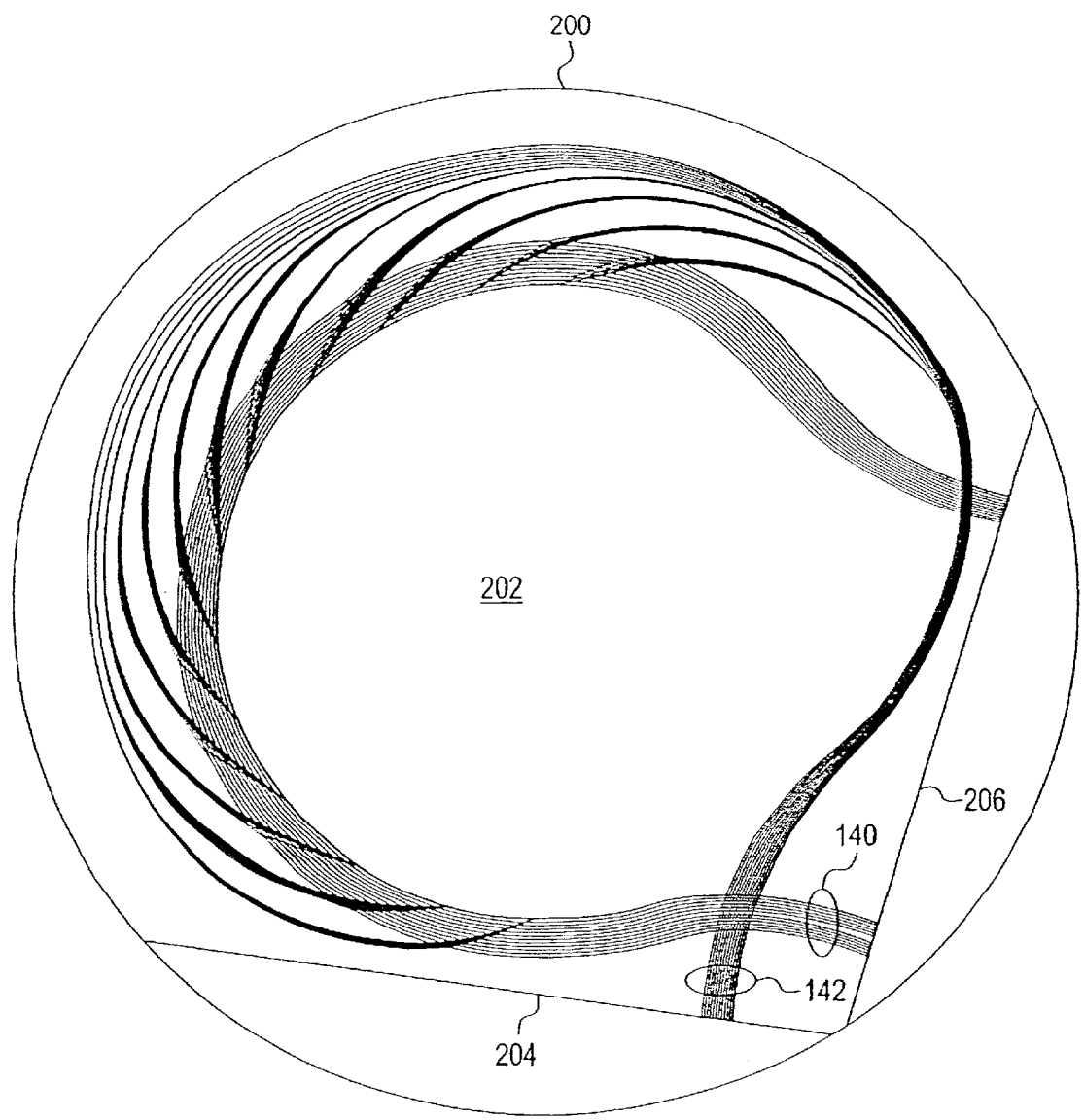
FIG. 9 shows the preferred layout of the embodiment of FIG. 5A on a surface of a z-cut lithium niobate crystal.

FIG. 9 shows the preferred layout of a switch array of the embodiment of FIG. 5A, on a surface 202 of a z-cut lithium niobate crystal 200, for coupling twelve input waveguides 140 to twelve output waveguides 142. Light enters input waveguides 140 via a surface 204 that is etched perpendicular to input waveguides 140. Light exits output waveguides 142 via a surface 206 that is etched perpendicular to output waveguides 142. Waveguides 140 and 142 are curved, with a radius of curvature of about 35 mm. If waveguides 140 and 142 are straight, as drawn in FIG. 5A, then input waveguides must be separated by about 0.7 mm to make sure that intermediate waveguides 148 cross input waveguides 140 at intersections 150 at at least a minimum angle θ of 11.5° to minimize cross-talk. Curving waveguides 140 and 142 as in FIG. 9 allows input waveguides 140 to be separated by only about 0.35 mm while still intersecting intermediate waveguides 148 at an angle θ of at least 11.5°.

The illustrative geometric parameters given above are for an optical switch array of the present invention that is fabricated in a lithium niobate substrate. It will be clear to those skilled in the art how to apply the present invention to other substrates, for example, polymer substrates and silica/Si substrates. In particular, the geometric constraints relevant to these other substrates will be clear to those skilled in the art While the invention has been described with respect to a limited number of embodiments, it will be appreciated that many variations, modifications and other applications of the invention may be made.

What is claimed is:

1. An optical switch array comprising:
   (a) at least three output waveguides;
   (b) a first group of at least three input waveguides;
   (c) for each of said input waveguides of said first group:
       for each of said output waveguides, a combining element coupling said each output waveguide only to said each input waveguide; and
   (d) for each of said input waveguides of said first group, a switching mechanism for coupling all of said output waveguides to said each input waveguide;
       said output waveguides, said input waveguides, said combining elements and said switching mechanism all being arranged substantially in a common plane; all of said output waveguides traversing successively respective said combining elements in a common order relative to said input waveguides of said first group.

2. The optical switch array of claim 1, further comprising:
   (e) for each of said input waveguides of said first group:
       for each of said output waveguides, an intermediate waveguide connecting said combining element, that couples said each output waveguide to said each input waveguide, to said switching mechanism;
       all of said intermediate waveguides being arranged substantially in said common plane.

3. The optical switch array of claim 2, wherein each said intermediate waveguide crosses at least one of said output waveguides.

4. The optical switch array of claim 3, wherein one of said at least one output waveguide crossed by said each intermediate waveguide is said first output waveguide.

5. The optical switch array of claim 2, wherein said output waveguides are substantially parallel, and wherein, for each said input waveguide of said first group, said combining elements that couple said output waveguides to said each input waveguide are mutually displaced along said output waveguides.

6. The optical switch array of claim 5, wherein said mutual displacement is such that, for each said input waveguide of said first group other than a last said input waveguide of said first group, said intermediate waveguide that couples a last said output waveguide to said each input waveguide avoids said intermediate waveguide that couples a first said output waveguide to a next said input waveguide of said first group.

7. The optical switch of claim 5, wherein said mutual displacement is such that, for each said input waveguide of said first group and for each said output waveguide other than a last said output waveguide, said intermediate waveguide that couples said each output waveguide to said each input waveguide avoids said intermediate waveguide that couples a next said output waveguide to said each input waveguide.

8. The optical switch array of claim 1, wherein said output waveguides are substantially parallel, and wherein, for each said input waveguide of said first group, said combining elements that couple said output waveguides to said each input waveguide are mutually displaced along said output waveguides.

9. The optical switch array of claim 1, wherein said switching elements are 1×2 switches.

10. The optical switch array of claim 9, wherein each of said 1×2 switches is selected from the group consisting of directional couplers, BOA couplers, digital-optical-switches and x-switches.

11. The optical switch array of claim 1, wherein said combining elements are y-junction combiners.

12. The optical switch array of claim 11, wherein said y-junction combiners are passive.

13. The optical switch array of claim 11, wherein at least one of said y-junction combiners is active.

14. The optical switch array of claim 13, wherein said at least one active y-junction combiner is selected from the group consisting of directional couplers, BOA couplers, digital-optical-couplers and x-switches.

15. A method for switching signals to at least one of at least three output channels from at least one of at least three input channels, each input channel providing signals to only one output channel, comprising the steps of:
  (a) providing an optical switch array including:
    (i) at least three output waveguides, each of said output waveguides corresponding uniquely to one of the output channels,
    (ii) at least three input waveguides, each of said input waveguides corresponding uniquely to one of the input channels,
    (iii) for each of said input waveguides:
      for each of said output waveguides, a combining element coupling said each output waveguide only to said each input waveguide, and
    (iv) for each of said input waveguides, a switching mechanism for coupling all of said output waveguides to said each input waveguide,
      said output waveguides, said input waveguides, said combining elements and said switching mechanism all being arranged substantially in a common plane, all of said output waveguides traversing successively respective said combining elements in a common order relative to said input waveguides; and
  (b) for each of said input waveguides corresponding to an input channel wherefrom a signal is to be switched: setting said switching mechanism to divert at least a portion of said signal to said output waveguide corresponding to the output channel whereto said signal is to be switched.

16. The method of claim 15, wherein, for each said input waveguide, said switching mechanism includes, for each said output waveguide, a switching element for coupling said each input waveguide to said each output waveguide, the method further comprising the step of:
  (c) for each of said input waveguides corresponding to an input channel wherefrom a signal is to be switched, setting at least one of said switching elements, that couples said each input waveguide to an output waveguide other than said output waveguide corresponding to an output channel whereto said signal is to be switched, to a straight-through state.

17. A method for multicasting from at least one of at least three input channel to at least two of at least three output channels, each output channel receiving input from only one input channel, comprising the steps of:
  (a) providing an optical switch array including:
    (i) at least three input waveguides, each of said input waveguides corresponding uniquely to one of the input channels,
    (ii) at least three output waveguides, each of said output waveguides corresponding uniquely to one of the output channels,
    (iii) for each of said input waveguides:
      for each of said output waveguides, a combining element coupling said each output waveguide only to said each input waveguide, and
    (iv) for each of said input waveguides, a switching mechanism for coupling all of said output waveguides to said each input waveguide, thereby coupling the input channel corresponding to said each input waveguide to the output channels,
      said input waveguides, said output waveguides, said combining elements and said switching mechanisms all being arranged substantially in a common plane, all of said output waveguides traversing successively respective said combining elements in a common order relative to said input waveguides; and
  (b) for each input channel wherefrom a signal is to be multicast:
    for each of the at least two output channels whereto said signal is to be sent, setting said switching mechanism, that couples said each input channel to said each output channel, to divert only a portion of said signal to said each output channel.

18. The method of claim 17, wherein, for each said input waveguide, said switching mechanism includes, for each said output waveguide, a switching element for coupling said each input waveguide to said each output waveguide, the method further comprising the step of:
  (c) for each input channel wherefrom a signal is to be multicast, setting at least one of said switching elements, that couples said each input channel to an output waveguide corresponding to an output channel other than the at least two output channels whereto said signal is to be sent, to a straight-through state.

* * * * *

UNITED STATES PATENT AND TRADEMARK OFFICE
CERTIFICATE OF CORRECTION

PATENT NO.   : 6,430,329 B1
DATED        : August 6, 2002
INVENTOR(S)  : Nir

It is certified that error appears in the above-identified patent and that said Letters Patent is hereby corrected as shown below:

<u>Title page,</u>
Item [73], the Assignee's name is mistakenly shown as "Photonix" when it should be
-- Photonics --.

Signed and Sealed this

Twenty-eighth Day of January, 2003

JAMES E. ROGAN
*Director of the United States Patent and Trademark Office*